(12) United States Patent
Zhang et al.

(10) Patent No.: US 11,929,469 B2
(45) Date of Patent: Mar. 12, 2024

(54) BATTERY MANAGEMENT SYSTEM, PROCESSING DEVICE, BATTERY MANAGEMENT METHOD, AND BATTERY MANAGEMENT AND CONTROL SYSTEM

(71) Applicant: Contemporary Amperex Technology Co., Limited, Ningde (CN)

(72) Inventors: Shichang Zhang, Ningde (CN); Ye Cao, Ningde (CN); Miaomiao Zhang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 187 days.

(21) Appl. No.: 17/234,770

(22) Filed: Apr. 19, 2021

(65) Prior Publication Data

US 2021/0242506 A1    Aug. 5, 2021

Related U.S. Application Data

(63) Continuation of application No. PCT/CN2020/116591, filed on Sep. 21, 2020.

(30) Foreign Application Priority Data

Dec. 4, 2019  (CN) .......................... 201911226463.9

(51) Int. Cl.
*H01M 10/00* (2006.01)
*H01M 10/42* (2006.01)
*H01M 10/48* (2006.01)

(52) U.S. Cl.
CPC ....... *H01M 10/425* (2013.01); *H01M 10/482* (2013.01); *H01M 2010/4271* (2013.01)

(58) Field of Classification Search
CPC ............. H01M 10/425; H01M 10/482; H01M 2010/4271; H01M 10/4207; H01M 10/441; H01M 2010/4278
See application file for complete search history.

(56) References Cited

U.S. PATENT DOCUMENTS

2007/0120536 A1* 5/2007 Runkle ............... H01M 10/482
                                                              429/50
2010/0261043 A1* 10/2010 Kim ..................... H02J 7/0024
                                                              429/61

(Continued)

FOREIGN PATENT DOCUMENTS

CN    108736077 A    3/2014
CN    203504219 U    3/2014

(Continued)

OTHER PUBLICATIONS

Machine translation of CN 110676431 A, obtained Feb. 2023 (Year: 2020).*

(Continued)

*Primary Examiner* — Nicholas P D'Aniello
(74) *Attorney, Agent, or Firm* — East IP P.C.

(57) ABSTRACT

The present application discloses a battery management system, a processing device, a battery management method, and a battery management and control system. The battery management system includes: an information transmission module configured to transmit, under a condition that it is determined that a connection relationship between unfailing cells of a target battery pack changes when a target failure cell in the target battery pack is isolated, original configuration information of the target battery pack to a processing device, so that the processing device generates adjusted configuration information according to the original configuration information; an information reception module configured to receive the adjusted configuration information transmitted by the processing device, wherein the adjusted configuration information includes an identification of the target failure cell; a management module configured to perform management operations on the unfailing cells of the (Continued)

target battery pack according to the adjusted configuration information.

11 Claims, 2 Drawing Sheets

(56) References Cited

U.S. PATENT DOCUMENTS

| | | | |
|---|---|---|---|
| 2016/0099598 A1 | 4/2016 | Gray | |
| 2017/0054306 A1* | 2/2017 | Vo | H02J 7/0024 |
| 2019/0245237 A1 | 8/2019 | Qiao et al. | |
| 2019/0383882 A1* | 12/2019 | Chen | G01R 31/371 |

FOREIGN PATENT DOCUMENTS

| | | |
|---|---|---|
| CN | 105393426 A | 3/2016 |
| CN | 105676136 A | 6/2016 |
| CN | 107425572 A | 12/2017 |
| CN | 207067281 U | 3/2018 |
| CN | 108028437 A | 5/2018 |
| CN | 108323186 A | 7/2018 |
| CN | 108899982 A | 11/2018 |
| CN | 109808517 A | 5/2019 |
| CN | 110165310 A | 8/2019 |
| CN | 110350624 A | 10/2019 |
| JP | 2014121231 A | 6/2014 |

OTHER PUBLICATIONS

The Rejection Decision for Chinese Application No. 201911226463.9, dated Jan. 20, 2023, 13 pages.
Introduction to New Energy Vehicles, Li Kai, Beijing Jiaotong University Press, dated Mar. 30, 2019, 3 pages.
Control and Protection of Industrial and Agricultural substation, Liu, Aicong, Shandong Science and Technology Press, dated Nov. 30, 1985, 2 pages.
Electrical Equipment and Repair, Chen, Liuhai, National Defense Industry Press, dated Mar. 31, 2008, 4 pages.
The Second Office Action for China Application No. 201911226463.9, dated May 30, 2022, 10 pages.
The International search report for PCT Application No. PCT/CN2020/116591, dated Dec. 25, 2020, 11 pages.
The extended European search report for EP Application No. 20875662.7, dated Dec. 21, 2021, 8 pages.
The First Office Action for China Application No. 201911226463.9, dated Jan. 10, 2022, 12 pages.

* cited by examiner

S310: transmitting, under a condition that it is determined that a connection relationship between non-failed battery cells of a target battery pack changes when a target failed battery cell in the target battery pack is isolated, original configuration information of the target battery pack to a processing device, so that the processing device generates adjusted configuration information according to the original configuration information S320: receiving the adjusted configuration information transmitted by the processing device, wherein the adjusted configuration information comprises an identification of the target failed battery cell S330: performing management operations on the non-failed battery cells of the target battery pack according to the adjusted configuration information

S410: generating adjusted configuration information based on original configuration information of a target battery pack transmitted by a BMS and an acquired identification of a target failed battery cell in the target battery pack S420: transmitting the adjusted configuration information to the BMS, so that the BMS performs management operations on non-failed battery cells of the target battery pack according to the adjusted configuration information

Fig. 4

BATTERY MANAGEMENT SYSTEM, PROCESSING DEVICE, BATTERY MANAGEMENT METHOD, AND BATTERY MANAGEMENT AND CONTROL SYSTEM

CROSS-REFERENCE TO RELATED APPLICATION

This application is a continuation of International Application No. PCT/CN2020/116591 filed on Sep. 21, 2020, which claims priority to Chinese Patent Application No. 201911226463.9 filed on Dec. 4, 2019, titled "BATTERY MANAGEMENT SYSTEM, PROCESSING DEVICE, BATTERY MANAGEMENT METHOD, AND BATTERY MANAGEMENT AND CONTROL SYSTEM", which is incorporated herein by reference in its entirety.

TECHNICAL FIELD

The present application relates to the field of battery power, and in particular, to a battery management system, a processing device, a battery management method, and a battery management and control system.

BACKGROUND

With the development of new energy, the new energy has been adopted as power in more and more fields. Due to the advantages of high energy density, recyclable charging, safety and environmental protection and the like, batteries are widely used in the fields of new energy vehicles, consumer electronics, energy storage systems and the like.

A battery management system (Battery Management System, BMS) is configured to perform management operations on a battery pack. Nevertheless, under a condition that a connection relationship between the cells in the battery pack changes, the management operations of the BMS to the battery pack will include erroneous operations, which reduces a management accuracy of the BMS to the battery pack.

SUMMARY

Embodiments of the present application provide a battery management system, a processing device, a battery management method, and a battery management and control system.

In a first aspect, an embodiment of the present application provides a battery management system, including: an information transmission module configured to transmit, under a condition that it is determined that a connection relationship between unfailing cells of a target battery pack changes when a target failure cell in the target battery pack is isolated, original configuration information of the target battery pack to a processing device, so that the processing device generates adjusted configuration information according to the original configuration information; an information reception module configured to receive the adjusted configuration information transmitted by the processing device, wherein the adjusted configuration information includes an identification of the target failure cell; a management module configured to perform management operations on the unfailing cells of the target battery pack according to the adjusted configuration information.

In some embodiments, the battery management system further includes:

a first instruction reception module configured to receive a first work instruction transmitted by the processing device;
a first instruction response module configured to determine, in response to the first work instruction, that the connection relationship between the unfailing cells of the target battery pack changes when the target failure cell in the target battery pack is isolated, and determine a suspected failure cell in the target battery pack, acquire an identification of the suspected failure cell, and transmit the identification of the suspected failure cell to the processing device, so that the processing device determines whether the suspected failure cell is the target failure cell according to the identification of the suspected failure cell.

In some embodiments, the battery management system further includes:

a second instruction reception module configured to receive a second work instruction transmitted by the processing device;
a second instruction response module configured to determine, according to the second work instruction, that the connection relationship between the unfailing cells of the target battery pack changes when the target failure cell in the target battery pack is isolated.

In some embodiments, the adjusted configuration information further includes information of the unfailing cells of the target battery pack, and the management module includes:

an adjustment coefficient determination unit configured to determine an adjustment coefficient of a performance parameter of the target battery pack according to the information of the unfailing cells of the target battery pack;
a performance parameter calculation unit configured to calculate the performance parameter of the target battery pack using the adjustment coefficient and an original performance parameter of the target battery pack,
wherein the performance parameter includes a charging characteristic parameter and/or a discharging characteristic parameter.

In some embodiments, the management module includes:
state collection units configured to collect state parameters of the unfailing cells in the target battery pack according to the adjusted configuration information;
a state judgment unit configured to judge whether states of the unfailing cells are abnormal according to the state parameters of the unfailing cells.

In some embodiments, the battery management system further includes:

a failure cell determination module configured to determine the target failure cell of the target battery pack according to the identification of the target failure cell;
a first arrangement module configured to arrange, according to an arrangement order of other cells in the target battery pack except the target failure cell, historical information of the other cells sequentially;
a second arrangement module configured to arrange historical information of the target failure cell after historical information of a last cell of the other cells,
wherein the historical information includes a cell parameter that characterizes usage of a cell.

In some embodiments, the original configuration information includes identifications of other failure cells in the target battery pack except the target failure cell or an identification that indicates the target battery pack includes no failure cell.

In some embodiments, the original configuration information and the adjusted configuration information further include information of the unfailing cells in the target battery pack, the information of the unfailing cells in the target battery pack includes at least one of following information:
a number of the unfailing cells in the target battery pack, a number of unfailing cells corresponding to each cell management unit, a number of state collection units corresponding to the unfailing cells in the target battery pack, a number of state collection units corresponding to each cell management unit, identifications of the unfailing cells in the target battery pack, identifications of the unfailing cells corresponding to each cell management unit, identifications of the state collection units corresponding to the unfailing cells in the target battery pack, and identifications of the state collection units corresponding to each cell management unit.

In some embodiments, a storage area of a program that implements a battery management method when executed by the BMS is different from a storage area of the configuration information.

In a second aspect, an embodiment of the present application provides a processing device, including: a configuration information generation module configured to generate adjusted configuration information based on original configuration information of a target battery pack transmitted by a battery management system BMS and an acquired identification of a target failure cell in the target battery pack; a configuration information transmission module configured to transmit the adjusted configuration information to the BMS, so that the BMS performs management operations on unfailing cells of the target battery pack according to the adjusted configuration information.

In some embodiments, the configuration information generation module includes:
an identification processing unit configured to add the identification of the target failure cell to the original configuration information;
a configuration information processing unit configured to use the original configuration information added with the identification of the target failure cell as the adjusted configuration information.

In some embodiments, the processing device further includes:
a first work instruction transmission module configured to transmit a first work instruction to the BMS, so as to prompt the BMS that a connection relationship between the unfailing cells of the target battery pack changes and instruct the BMS to return the original configuration information and an identification of a suspected failure cell;
an identification reception module configured to receive the original configuration information and the identification of the suspected failure cell;
an identification processing module configured to use, under a condition that it is determined that the suspected failure cell is the target failure cell according to the identification of the suspected failure cell, the identification of the suspected failure cell as the identification of the target failure cell.

In some embodiments, the processing device further includes:
a first input response module configured to determine, in response to an input operation indicating the suspected failure cell is the target failure cell, the suspected failure cell is the target failure cell.

In some embodiments, the processing device further includes:
a second input response module configured to transmit, in response to an operation of inputting the identification of the target failure cell, a second work instruction to the BMS, so as to prompt the BMS that a connection relationship between the unfailing cells of the target battery pack changes and instruct the BMS to return the original configuration information.

In a third aspect, an embodiment of the present application provides a battery management method applied to a battery management system BMS, wherein the battery management method includes: transmitting, under a condition that it is determined that a connection relationship between unfailing cells of a target battery pack changes when a target failure cell in the target battery pack is isolated, original configuration information of the target battery pack to a processing device, so that the processing device generates adjusted configuration information according to the original configuration information; receiving the adjusted configuration information transmitted by the processing device, wherein the adjusted configuration information includes an identification of the target failure cell; performing management operations on the unfailing cells of the target battery pack according to the adjusted configuration information.

In some embodiments, the battery management method further includes:
receiving a first work instruction transmitted by the processing device;
determining, in response to the first work instruction, that the connection relationship between the unfailing cells of the target battery pack changes when the target failure cell in the target battery pack is isolated, and determining a suspected failure cell in the target battery pack, acquiring an identification of the suspected failure cell, and transmitting the identification of the suspected failure cell to the processing device, so that the processing device determines whether the suspected failure cell is the target failure cell according to the identification of the suspected failure cell.

In some embodiments, the battery management method further includes:
receiving a second work instruction transmitted by the processing device;
determining, according to the second work instruction, that the connection relationship between the unfailing cells of the target battery pack changes when the target failure cell in the target battery pack is isolated.

In some embodiments, the adjusted configuration information further includes information of the unfailing cells of the target battery pack, and
performing management operations on the unfailing cells of the target battery pack according to the adjusted configuration information includes:
determining an adjustment coefficient of a performance parameter of the target battery pack according to the information of the unfailing cells of the target battery pack;
calculating the performance parameter of the target battery pack using the adjustment coefficient and an original performance parameter of the target battery pack, wherein the performance parameter includes a charging characteristic parameter and/or a discharging characteristic parameter.

In some embodiments, performing management operations on the unfailing cells of the target battery pack according to the adjusted configuration information includes:

collecting state parameters of the unfailing cells in the target battery pack according to the adjusted configuration information;

judging whether states of the unfailing cells are abnormal according to the state parameters of the unfailing cells.

In some embodiments, the battery management method further includes:

determining the target failure cell of the target battery pack according to the identification of the target failure cell;

arranging, according to an arrangement order of other cells in the target battery pack except the target failure cell, historical information of the other cells sequentially;

arranging historical information of the target failure cell after historical information of a last cell of the other cells, wherein the historical information includes a cell parameter that characterizes usage of a cell.

In some embodiments, the original configuration information includes identifications of other failure cells in the target battery pack except the target failure cell or an identification that indicates the target battery pack includes no failure cell.

In some embodiments, the original configuration information and the adjusted configuration information further include information of the unfailing cells in the target battery pack, the information of the unfailing cells in the target battery pack includes at least one of following information: a number of the unfailing cells in the target battery pack, a number of unfailing cells corresponding to each cell management unit, a number of state collection units corresponding to the unfailing cells in the target battery pack, a number of state collection units corresponding to each cell management unit, identifications of the unfailing cells in the target battery pack, identifications of the unfailing cells corresponding to each cell management unit, identifications of the state collection units corresponding to the unfailing cells in the target battery pack, and identifications of the state collection units corresponding to each cell management unit.

In some embodiments, a storage area of a program that implements the battery management method when executed by the BMS is different from a storage area of the configuration information.

In a fourth aspect, an embodiment of the present application provides a battery management method applied to a processing device, wherein the battery management method includes: generating adjusted configuration information based on original configuration information of a target battery pack transmitted by a battery management system BMS and an acquired identification of a target failure cell in the target battery pack; transmitting the adjusted configuration information to the BMS, so that the BMS performs management operations on unfailing cells of the target battery pack according to the adjusted configuration information.

In some embodiments, generating the adjusted configuration information based on the original configuration information of the target battery pack transmitted by the BMS and the acquired identification of the target failure cell in the target battery pack includes:

adding the identification of the target failure cell to the original configuration information;

using the original configuration information added with the identification of the target failure cell as the adjusted configuration information.

In some embodiments, the battery management method further includes:

transmitting a first work instruction to the BMS, so as to prompt the BMS that a connection relationship between the unfailing cells of the target battery pack changes and instruct the BMS to return the original configuration information and an identification of a suspected failure cell;

receiving the original configuration information and the identification of the suspected failure cell;

using, under a condition that it is determined that the suspected failure cell is the target failure cell according to the identification of the suspected failure cell, the identification of the suspected failure cell as the identification of the target failure cell.

In some embodiments, the battery management method further includes:

determining, in response to an input operation indicating the suspected failure cell is the target failure cell, the suspected failure cell is the target failure cell.

In some embodiments, the battery management method further includes:

transmitting, in response to an operation of inputting the identification of the target failure cell, a second work instruction to the BMS, so as to prompt the BMS that a connection relationship between the unfailing cells of the target battery pack changes and instruct the BMS to return the original configuration information.

In a fifth aspect, an embodiment of the present application provides a battery management and control system, including: the battery management system provided in the embodiments of the present application, and the processing device provided in the embodiments of the present application.

BRIEF DESCRIPTION OF THE DRAWINGS

The drawings required to describe embodiments of the present application are introduced briefly below to illustrate technical solutions of the embodiments of the present application more clearly. Obviously, the drawings described below are only some embodiments of the present application, and other drawings may be obtained by those ordinary skilled in the art from those drawings without any creative work.

DETAILED DESCRIPTION

Features and exemplary embodiments of various aspects of the present application will be described in detail below. In order to make the objects, technical solutions and advantages of the present application clear, the present application will be further described in detail below in conjunction with the drawings and embodiments. It should be understood that the specific embodiments described herein are only configured for explaining the present application, and not configured for limiting the present application. For a person skilled in the art, the present application may be implemented without some of these specific details. The following descriptions of the embodiments are merely to provide a better understanding of the present application by illustrating the examples of the present application.

It should be noted that, in the present application, relational terms, such as first and second, are used merely to distinguish one entity or operation from another entity or operation, without necessarily requiring or implying any actual such relationships or orders of these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

The words of orientation appearing in the following description are all directions shown in the figures, and do not limit the specific structure of the present application. In the description of the present application, it should also be noted that, unless otherwise clearly specified and limited, the terms "installing", "coupling", and "connecting" should be understood in a broad sense, for example, it can be a fixed connection, a detachable connection, or an integral connection; it can be directly connected, or indirectly connected through an intermediate medium. For those of ordinary skill in the art, the specific meanings of the above-mentioned terms in the present application can be understood according to specific circumstances.

The embodiments of the present application provide a battery management system, a processing device, a battery management method, and a battery management and control system, which can be applied to specific scenarios of adjusting management of the BMS to cells under a condition that a target failure cell in a target battery pack is isolated and a connection relationship between unfailing cells of the target battery pack is changed. The battery pack may be a battery pack including at least one battery module, or a CTP (Cell to Pack) battery pack, which is not limited herein. The CTP battery pack includes at least one cell, and each cell does not need to be packaged as a battery module. The connection mode between the cells may be a series connection, a parallel connection, or a hybrid connection, and the connection mode is not specifically limited.

In the embodiments of the present application, under a condition that a cell in the battery pack is failed in the process of production, transportation, and use, the performance, reliability, and battery safety of the battery pack may be affected. Herein, a failure of the cell may be a performance failure of the cell, such as capacity diving, cycle performance degradation, abnormal voltage, abnormal current, excessive internal resistance, self-discharge, high/low temperature failure, poor rate performance, poor consistency, and the like. Moreover, the failure of the cell may be a safety failure of the cell, such as thermal runaway, short circuit, liquid leakage, flatulence, lithium evolution, expansion deformation, puncture, squeeze, and the like.

In the embodiments of the present application, under a condition that a cell in the battery pack is failed, in order to ensure the normal operation and use of the battery pack, the maintenance personnel can isolate the failure cell and connect the other unfailing cells in the battery pack by manual operation. For example, for a battery pack that includes a plurality of cells connected in series, when one of the cells is failed, a previous cell and a next cell of that cell can be connected in series. Herein, the way of isolation may be connecting the other unfailing cells after removing the failure cell from the battery pack, or connecting the other unfailing cells via bypassing the failure cell which is still placed in the battery pack. Especially, for the CTP battery pack, when a cell is failed, the entire CTP battery pack should be replaced in the traditional solution. Nevertheless, in the embodiments of the present application, as long as the failure cell is isolated, the normal operation and use of the CTP battery pack can be guaranteed, which prolongs the service life of the CTP battery pack and reduces the use cost thereof.

In some embodiments, considering that the failure cell in the battery pack is isolated and the other unfailing cells in the battery pack are reconnected, the connection mode of the other unfailing cells in the battery pack and the performance parameter of the battery pack will change. If the battery management system performs management operations on the cells in the previous manner, the management accuracy of the battery management system will be affected. For example, the battery management system may continue to collect the state parameter of the failure cell, continue to monitor the state of the failure cell, or continue to use the original performance parameter of the battery pack as the current performance parameter of the battery pack. The compatibility of the battery management system with the battery pack degrades.

Therefore, it is necessary to provide a technical solution that can ensure the management accuracy of the battery management system to the battery pack containing the failure cell.

Figure 1:
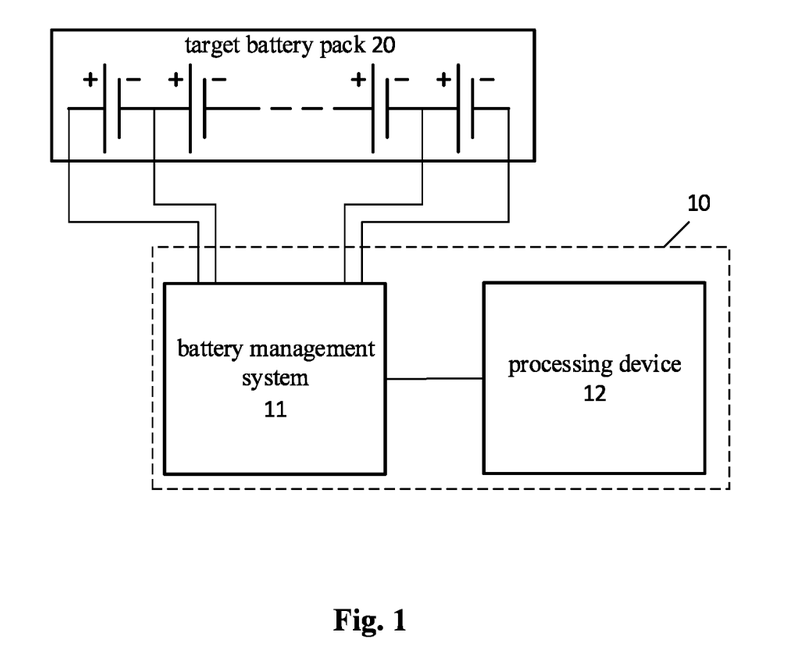
FIG. 1 a schematic structural diagram of a battery management system disclosed by an embodiment of the present application.

FIG. 1 is a schematic structural diagram of a battery management and control system according to an embodiment of the present application. As shown in FIG. 1, the battery management and control system 10 includes a battery management system 11 and a processing device 12. Herein, the battery management system 11 and the processing device may be connected by a wired connection or a wireless communication connection, which is not limited.

Under a condition that there is no failure cell in a target battery pack 20 or no new failure cell is generated, the battery management system 11 may perform management operations on the target battery pack 20 according to the original configuration information of the battery pack.

Under a condition that a failure of a new cell is repaired in the target battery pack 20 (that is, because of the new failure cell is generated in the target battery pack 20, the new failure cell in the target battery pack 20 is isolated and the connection relationship between the other unfailing cells in the target battery pack 20 is changed), the battery management system 11 may transmit an original configuration information that is only compatible with the target battery pack 20 before repairing to the processing device 12. The processing device 12 generates an adjusted configuration information that is new and more suitable for the repaired target battery pack 20 based on the original configuration information.

Herein, the configuration information including the original configuration information and the adjusted configuration information can identify the failure cell in the target battery pack 20. Specifically, the identification of the failure cell may be included, and the identification is used to prove the identity of the failure cell in the target battery pack 20. For example, the identification may be the number of the failure cell or the location of the failure cell, which is not limited. Under a condition that there is no failure cell in the target battery pack, the configuration information includes an identification that indicating the target battery pack 20 includes no failure cell. For example, an agreed default value may be used to indicate the target battery pack 20 includes no failure cell. For example, if a value of a certain position in the configuration information is "#05", it indicates that the fifth cell in the target battery pack is a failure cell, and if the value of the configuration information is "#00", it indicates that the target battery pack 20 includes no failure cell.

In some embodiments, the configuration information may also include information of a state collection unit corresponding to the failure cell. For example, the information may be a position of a negative temperature coefficient (Negative Temperature Coefficient, NTC) sensor used to collect a temperature of the failure cell or an identification of the NTC sensor. The state collection unit may also be a sensor used to collect a voltage, a current and other states of the failure cell, which is not limited.

In addition, the configuration information may also include information of the unfailing cells in the target battery pack 20. Herein, the information of the unfailing cells may be quantitative characteristics or identification characteristics of the unfailing cells. Specifically, the information of unfailing cells may include at least one of following information: a number of the unfailing cells in the target battery pack, a number of unfailing cells corresponding to each cell management unit of the battery management system, a number of state collection units corresponding to the unfailing cells in the target battery pack, a number of state collection units corresponding to the each cell management unit of the battery management system, identifications of the unfailing cells in the target battery pack, identifications of the unfailing cells corresponding to the each cell management unit of the battery management system, identifications of the state collection units corresponding to the unfailing cells in the target battery pack, and identifications of the state collection units corresponding to the each cell management unit of the battery management system. Herein, for the content of the identifications of the unfailing cells and the identifications of the state collection units, please refer to the related description of the identification of the failure cell in the above section, which will not be repeated here.

Figure 2:
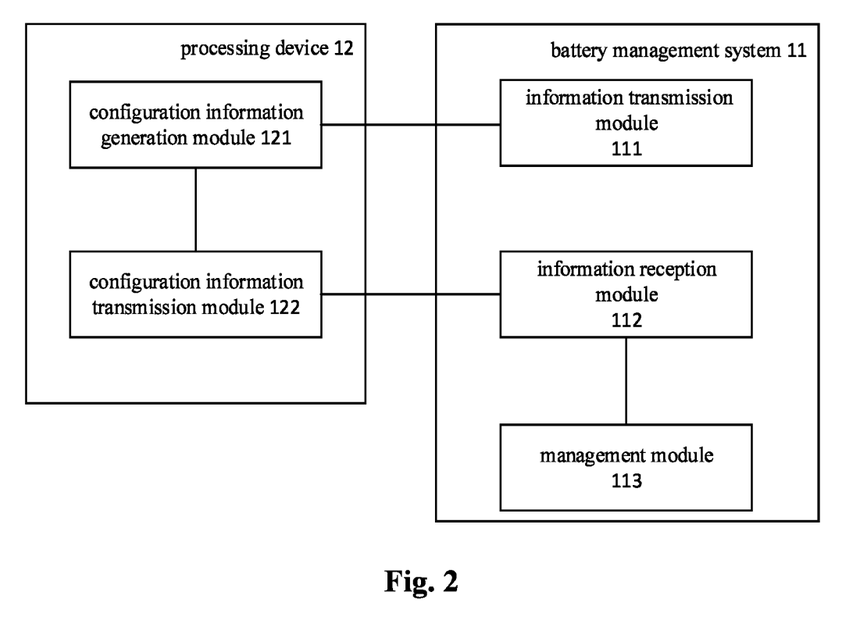
FIG. 2 is a specific schematic structural diagram of a battery management and control system disclosed by an embodiment of the present application.

FIG. 2 is a schematic structural diagram of a battery management and control system according to an embodiment of the present application. As shown in FIG. 2, the battery management system 11 may include an information transmission module 111, an information reception module 112 and a management module 113.

The information transmission module 111 is configured to transmit, under a condition that it is determined that a connection relationship between unfailing cells of a target battery pack 20 changes when a target failure cell in the target battery pack 20 is isolated, original configuration information of the target battery pack 20 to a processing device 12, so that the processing device 12 generates adjusted configuration information according to the original configuration information.

The target failure cell is a newly generated failure cell in the target battery pack 20. Before the target failure cell is failed, none of the cells in the target battery pack 20 is failed or there are other failure cells. It should be noted that, if the target battery pack 20 includes other failure cells before the target failure cell is failed, the other failure cells can be repaired, that is, the other failure cells in the target battery pack 20 can be isolated and the connection relationship between the unfailing cells can be adjusted. At this time, the adjusted configuration information corresponding to the target battery pack 20 in which the other failure cells are isolated may be used as the original configuration information corresponding to the target battery pack in which the target failure cell is isolated. The original configuration information corresponding to the target battery pack 20 in which the target failure cell is isolated may include the identifications of the other failure cells.

The differences between the original configuration information and the adjusted configuration information are as follows.

First, the adjusted configuration information includes the identification of the target failure cell.

Second, under a condition that the configuration information also includes the information of the unfailing cells in the target battery pack 20, with respect to the number of the unfailing cells in the target battery pack 20 and the number of unfailing cells corresponding to the cell management unit of the target failure cell, the above two numbers in the adjusted configuration information are reduced by the number of the target failure cells compared with those in the original configuration information.

With respect to the number of the state collection units corresponding to the unfailing cells in the target battery pack 20 and the number of the state collection units corresponding to each cell management unit of the battery management system 11, the above two numbers in the adjusted configuration information are reduced by the number of the state collection unit corresponding to the target failure cell compared with those in the original configuration information. Further, with respect to the identifications of the unfailing cells in the target battery pack 20 and the identifications of the unfailing cells corresponding to each cell management unit of the battery management system 11, the above identifications in the adjusted configuration information are reduced by the identification of the target failure cell compared with those in the original configuration information.

With respect to the identifications of the unfailing cells in the target battery pack 20, the identifications of the unfailing cells corresponding to each cell management unit of the battery management system 11, and the identifications of the state collection units corresponding to each cell management unit of the battery management system 11, the above identifications in the adjusted configuration information are reduced by the number of the target failure cells compared with those in the original configuration information. Further, with respect to the identifications of the state collection units corresponding to the unfailing cell in the target battery pack 20 and the identifications of the state collection units corresponding to each cell management unit of the battery management system 11, the above identifications in the adjusted configuration information are reduced by the identification of the state collection unit corresponding to the target failure cell compared with those in the original configuration information.

For other specific descriptions of the original configuration information and the adjusted configuration information, please refer to the relevant content in the above-mentioned embodiments, which will not be repeated here.

In addition, after receiving a work instruction transmitted by the processing device 12, the battery management system 11 may determine that the connection relationship between the unfailing cells of the target battery pack 20 changes when the target failure cell in the target battery pack 20 is isolated. The work instruction may be a first work instruction or a second work instruction.

Herein, under a condition that the processing device 12 cannot obtain the identification of the target failure cell in advance, the processing device 12 transmits the first work instruction to the battery management system 11, so as to prompt the battery management system 11 that the connection relationship between the unfailing cells of the target battery pack 20 is changed, and instruct the battery management system 11 to return the original configuration information and the identification of the suspected failure cell. Under a condition that the processing device 12 has obtained the identification of the target failure cell in advance, the processing device 12 transmits a second work instruction to the battery management system 11, so as to prompt the battery management system 11 that the connection relationship between the unfailing cells of the target battery pack 20 is changed, and instruct the battery management system 11 to return to the original configuration information.

In some embodiments, in order to respond to the first work instruction successfully, the battery management system 11 further includes a first instruction reception module and a first instruction response module.

The first instruction reception module is configured to receive the first work instruction transmitted by the processing device.

The first instruction response module is configured to determine, in response to the first work instruction, that the connection relationship between the unfailing cells of the target battery pack 20 changes when the target failure cell in the target battery pack 20 is isolated.

The first instruction response module is further configured to determine a suspected failure cell in the target battery pack 20, acquire an identification of the suspected failure cell, and transmit the identification of the suspected failure cell to the processing device 12, so that the processing device 12 determines whether the suspected failure cell is the target failure cell according to the identification of the suspected failure cell. Herein, considering that the voltage across the isolated failure cell may drop to 0, the target battery pack 20 may collect the voltage parameters of each cell, and identify the cell with a voltage parameter of 0 as the suspected failure cell.

In some embodiments, in order to respond to the second work instruction successfully, the battery management system 11 further includes a second instruction reception module and a second instruction response module.

The second instruction reception module is configured to receive the second work instruction transmitted by the processing device 12.

The second instruction response module is configured to determine, according to the second work instruction, that the connection relationship between the unfailing cells of the target battery pack 20 changes when the target failure cell in the target battery pack 20 is isolated. Herein, the specific implementation of the second instruction response module is the same as that of the first instruction response module, which will not be repeated here.

The information reception module 112 is configured to receive the adjusted configuration information transmitted by the processing device 12, wherein the adjusted configuration information includes the identification of the target failure cell. Herein, for the specific description of the adjusted configuration information, please refer to the relevant content in the foregoing embodiments, which will not be repeated here.

The management module 113 is configured to perform management operations on the unfailing cells of the target battery pack 20 according to the adjusted configuration information. Herein, the management operations may include calculating the performance parameter of the target battery pack 20, adjusting the sampling objects, adjusting the abnormal diagnosis objects, and the like.

Under a condition that the management module 113 has a function of calculating the performance parameter of the target battery pack 20, the management module 113 may include an adjustment coefficient determination unit and a performance parameter calculation unit. Herein, the adjustment coefficient determining unit is configured to determine an adjustment coefficient of the performance parameter of the target battery pack 20 according to the information of the unfailing cells of the target battery pack 20. The adjustment coefficient may be calculated by the number of the unfailing cells divided by a sum of the number of the unfailing cells and the number of the target failure cells. For example, under a condition that the number of the unfailing cells is N and the number of the target failure cells is M, the adjustment system may be equal to N/(N+M), and M and N are integers. The performance parameter calculation unit is configured to calculate the performance parameter of the target battery pack 20 using the adjustment coefficient and the original performance parameter of the target battery pack 20. Specifically, the performance parameter of the target battery pack 20 may be a product of the original performance parameter and the adjustment coefficient. Herein, the performance parameter includes a charging characteristic parameter and/or a discharging characteristic parameter. The charging characteristic parameter may include at least one of a charging voltage, a charging current, a charging power, a charging state of charge (State of Charge, SOC), a charging capacity, and the like. The discharge characteristic parameter may include at least one of a discharging voltage, a discharging current, a discharging power, a discharging SOC, a discharging capacity, and the like.

It should be noted that, since the original performance parameter is larger than the recalculated performance parameter, if the original performance parameter is continued to be used, the calculation accuracy of the battery management system 11 will be affected, and the safety of the target battery pack 20 may be affected by using the original performance parameter.

Under a condition that the management module 113 has a function of adjusting the sampling objects, the management module 113 may include state collection units. The state collection units are configured to collect the state parameters of the unfailing cells in the target battery pack 20 according to the adjusted configuration information. That is, before adjusting the sampling object, the battery management system 11 needs to collect the state parameter of the target failure cell and the state parameters of the unfailing cells. After adjusting the sampling objects, there is no need to collect the state parameter of the target failure cell, and it is only necessary to collect the state parameters of the unfailing cells. It is ensured that the collected state parameters only include the state parameters of the unfailing cells, which can reduce the amount of data processing of the battery management system 11, and avoid the error influence of the state parameters of the unfailing cells on the subsequent processing process. Herein, the state parameter of the unfailing cell includes one or more of a current, a voltage, and a temperature. Other state parameters may also be collected according to other needs, which is not limited.

Under a condition that the management module 113 has a function of adjusting the abnormal diagnosis objects, the management module 113 may include state collection units and a state judgment unit. For the relevant content of the state collection units, please refer to the specific description of the foregoing embodiments, which will not be repeated here. The state judgment unit is configured to judge whether states of the unfailing cells are abnormal according to the state parameters of the unfailing cells. Specifically, it can be judged whether the state exceeds a normal value range. Before adjusting, the management module 113 needs to diagnose whether the unfailing cells and the target failure cell are in abnormal state. After adjusting, the management module 113 only needs to diagnose whether the unfailing cells are in abnormal state.

According to the battery management system in the embodiment of the present application, under a condition that the connection relationship between the unfailing cells of the target battery pack 20 is changed due to the target battery pack 20 includes the target failure cell, the processing device 12 is able to generate the adjusted configuration information containing the identification of the target failure cell. After receiving the adjusted configuration information transmitted by the processing device 12, the battery management system 11 is able to determine the target failure cell in the target battery pack 20 according to the identification of the target failure cell. The decline of the management accuracy of the battery management system 11 caused by the battery management system 11 not knowing whether each cell in the target battery pack is failed can be avoided, thereby ensuring the management accuracy of the battery management system 11.

In some embodiments of the present application, the battery management system 11 may also sort the historical data of each cell. Herein, the historical data may include a cell parameter that characterizes usage of a cell. For example, the cell parameter may be one or more of a SOC of the cell, a state of health (State of Health, SOH) of the cell, and a direct current resistance (Direct Current Resistance, DCR).

Specifically, under a condition that the function of sorting is implemented, the battery management system 11 includes: a failure cell determination module, a first arrangement module, and a second arrangement module. The failure cell determination module is configured to determine the target failure cell of the target battery pack 20 according to the identification of the target failure cell. The first arrangement module is configured to arrange, according to an arrangement order of other cells in the target battery pack 20 except the target failure cell, historical information of the other cells sequentially. The second arrangement module is configured to arrange historical information of the target failure cell after historical information of a last cell of the other cells. Illustratively, under a condition that the target battery pack 20 includes 6 cells which are cell 1, cell 2, cell 3, cell 4, cell 5, and cell 6 in order, and wherein the cell 5 is the target failure cell and the other cells are unfailing cells, then the result of the arrangement may be the historical data of the cell 1, the historical data of the cell 2, the historical data of the cell 3, the historical data of the cell 4, the historical data of the cell 6, and the historical data of the cell 5. It should be noted that, the historical data of the target failure cell can first be placed in the last place, and then the historical data of the other cells can be arranged. On the premise that the sorting results are the same, the specific sorting steps are not limited.

The historical data of the unfailing cells can be distinguished from the historical data of the failure cell by reordering the order of each cell, so as to facilitate the external call of the historical data of each cell in the subsequent process for data analysis and processing, or to facilitate the use of the historical data of each cell by the battery management system 11. For example, it is convenient to accurately calculate the SOC of the target battery pack 20 using the SOC of each cell.

In some embodiments of the present application, a storage area of a program that implements the battery management method when executed by the battery management system 11 is different from a storage area of the configuration information. Under a condition that the battery management system 11 needs to use the configuration information, the configuration information can be called. Specifically, the executive program and the configuration information can be divided into different memory address segments respectively, and the executive program and the configuration information will be stored in different address spaces when the software is compiled.

In some cases, the configuration information and the executive program are mixed together, and the configuration information cannot be modified separately. In the embodiments of the present application, the battery management system 11 separates the program from the configuration information, and the configuration information can be separately modified without affecting the executive program.

In addition, in order to prevent the configuration information from disappearing due to power failure of the battery management system 11, the configuration information may be stored in a non-volatile memory (Non-Volatile Memory, NVM).

Continuing to refer to FIG. 2, as shown in FIG. 2, the processing device 12 includes a configuration information generation module 121 and a configuration information transmission module 122.

The configuration information generation module 121 is configured to generate adjusted configuration information based on original configuration information of a target battery pack 20 transmitted by a battery management system 11 and an acquired identification of a target failure cell in the target battery pack.

First, the identification of the target failure cell may be directly input to the processing device 12 from the outside of the battery management and control system 10. For example, it can be entered by maintenance personnel. At this time, the processing device 12 may obtain the identification of the target failure cell in response to an operation of inputting the identification of the target failure cell. Correspondingly, the processing device 12 further includes a second input response module configured to transmit, in response to the operation of inputting the identification of the target failure cell, a second work instruction to the battery management system 11, so as to prompt the battery management system 11 that a connection relationship between the unfailing cells of the target battery pack 20 changes and instruct the battery management system 11 to return the original configuration information.

Alternatively, the identification of the target failure cell may be confirmed according to the identification of the suspected failure cell transmitted by the battery management system 11. The processing device 12 also includes a first work instruction transmission module, an identification reception module, and an identification processing module.

The first work instruction transmission module is configured to transmit a first work instruction to the battery management system 11, so as to prompt the battery management system 11 that a connection relationship between the unfailing cells of the target battery pack 20 changes and instruct the battery management system 11 to return the original configuration information and the identification of the suspected failure cell.

The identification reception module is configured to receive the original configuration information and the identification of the suspected failure cell.

The identification processing module is configured to use, under a condition that it is determined that the suspected failure cell is the target failure cell according to the identification of the suspected failure cell, the identification of the suspected failure cell as the identification of the target failure cell. Herein, the processing device 12 itself can determine whether the suspected failure cell is the target failure cell. Specifically, the processing device 12 may obtain the voltage parameters of each cell, and confirm the target failure cell according to the voltage parameters of each cell. For example, a cell with a voltage parameter of 0 is identified as the suspected failure cell. Herein, the processing device 12 can confirm the target failure cell according to the voltage parameters of each cell. It is also possible that the processing device 12 provides the voltage parameters of each cell to an external device, and confirm the target failure cell in response to an operation of inputting the target failure cell from the external device. Alternatively, the target failure cell may be confirmed externally from the battery management and control system 10. Correspondingly, the processing device 12 further includes a first input response module. The first input response module is configured to determine, in response to an input operation indicating the suspected failure cell is the target failure cell, the suspected failure cell is the target failure cell. Herein, the input operation may be an input operation by maintenance personnel, or an automatic input operation of an external program, which is not limited.

Further, the configuration information generation module 121 may include an identification processing unit and a configuration information processing unit.

The identification processing unit is configured to add the identification of the target failure cell to the original configuration information. In an embodiment, under a condition that the original configuration information includes an identification that indicates the target battery pack 20 includes no failure cell, the identification processing unit may replace the identification that indicates the target battery pack 20 includes no failure cell in the original configuration information with the identification of the target failure cell. In another embodiment, under a condition that the original configuration information includes the identifications of other failure cells, after adding the identification of the target failure cell to the original configuration information, the processing device 12 may use the original configuration information added with the identification of the target failure cell as the adjusted configuration information. For example, if the original configuration information includes the identification of the failure cell A and the identification of the failure cell B, then the adjusted configuration information includes the identification of the failure cell A, the identification of the failure cell B, and the identification of the target failure cell C.

The configuration information processing unit is configured to use the original configuration information added with the identification of the target failure cell as the adjusted configuration information.

The configuration information transmission module 122 is configured to transmit the adjusted configuration information to the BMS, so that the BMS performs management operations on unfailing cells of the target battery pack according to the adjusted configuration information.

According to the processing device in the embodiment of the present application, under a condition that the connection relationship between the unfailing cells of the target battery pack 20 is changed due to the target battery pack 20 includes the target failure cell, the processing device 12 is able to generate the adjusted configuration information containing the identification of the target failure cell. After receiving the adjusted configuration information transmitted by the processing device 12, the battery management system 11 is able to determine the target failure cell in the target battery pack 20 according to the identification of the target failure cell. The decline of the management accuracy of the battery management system 11 caused by the battery management system 11 not knowing whether each cell in the target battery pack 20 is failed can be avoided, thereby ensuring the management accuracy of the battery management system 11.

Figure 3:
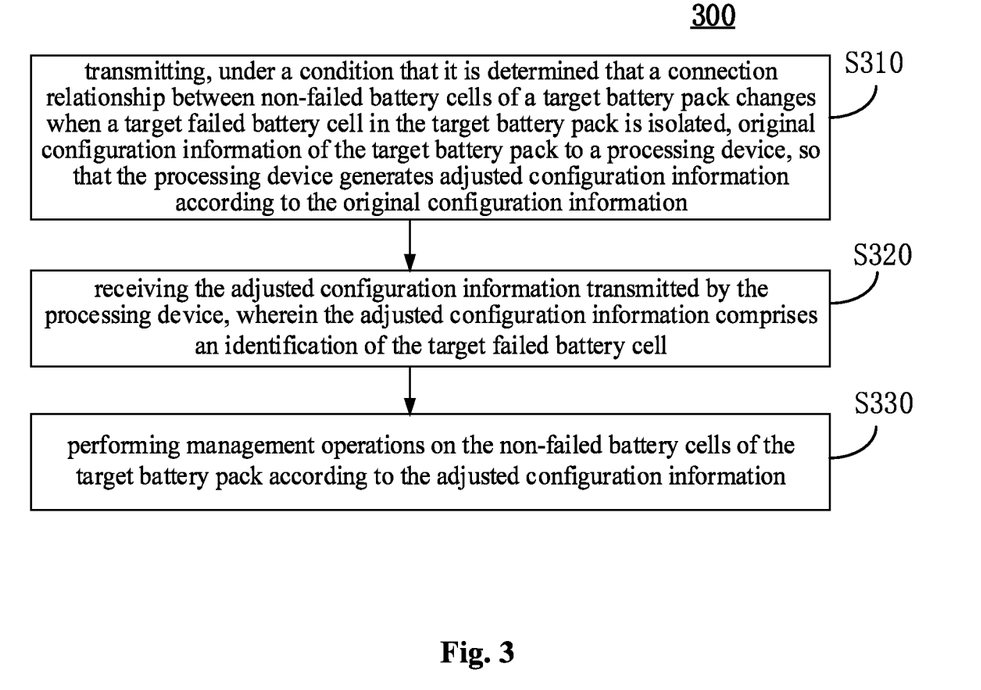
FIG. 3 is a schematic flowchart of a battery management method disclosed by an embodiment of the present application.

FIG. 3 is a schematic flowchart of a battery management method according to an embodiment of the present application. The battery management method is applied to the battery management system. As shown in FIG. 3, the battery management method includes S310 to S330.

S310: transmitting, under a condition that it is determined that a connection relationship between unfailing cells of a target battery pack changes when a target failure cell in the target battery pack is isolated, original configuration information of the target battery pack to a processing device, so that the processing device generates adjusted configuration information according to the original configuration information.

S320: receiving the adjusted configuration information transmitted by the processing device, wherein the adjusted configuration information comprises an identification of the target failure cell.

S330: performing management operations on the unfailing cells of the target battery pack according to the adjusted configuration information.

In some embodiments of the present application, the battery management method 300 further includes:
  receiving a first work instruction transmitted by the processing device; determining, in response to the first work instruction, that the connection relationship between the unfailing cells of the target battery pack changes when the target failure cell in the target battery pack is isolated; and determining a suspected failure cell in the target battery pack, acquiring an identification of the suspected failure cell, and transmitting the identification of the suspected failure cell to the processing device, so that the processing device determines whether the suspected failure cell is the target failure cell according to the identification of the suspected failure cell.

In some embodiments of the present application, the battery management method 300 further includes:
  receiving a second work instruction transmitted by the processing device; determining, according to the second work instruction, that the connection relationship between the unfailing cells of the target battery pack changes when the target failure cell in the target battery pack is isolated.

In some embodiments of the present application, the adjusted configuration information further comprises information of the unfailing cells of the target battery pack. S330 includes:

determining an adjustment coefficient of a performance parameter of the target battery pack according to the information of the unfailing cells of the target battery pack; calculating the performance parameter of the target battery pack using the adjustment coefficient and an original performance parameter of the target battery pack. Herein, the performance parameter comprises a charging characteristic parameter and/or a discharging characteristic parameter.

In some embodiments of the present application, S330 includes:

collecting state parameters of the unfailing cells in the target battery pack according to the adjusted configuration information; judging whether states of the unfailing cells are abnormal according to the state parameters of the unfailing cells.

In some embodiments of the present application, the battery management method 300 further includes:

determining the target failure cell of the target battery pack according to the identification of the target failure cell; arranging, according to an arrangement order of other cells in the target battery pack except the target failure cell, historical information of the other cells sequentially; arranging historical information of the target failure cell after historical information of a last cell of the other cells. Herein, the historical information comprises a cell parameter that characterizes usage of a cell.

In some embodiments of the present application, the original configuration information comprises identifications of other failure cells in the target battery pack except the target failure cell or an identification that indicates the target battery pack comprises no failure cell.

In some embodiments of the present application, the original configuration information and the adjusted configuration information further comprise information of the unfailing cells in the target battery pack.

The information of the unfailing cells in the target battery pack comprises at least one of following information: a number of the unfailing cells in the target battery pack, a number of unfailing cells corresponding to each cell management unit, a number of state collection units corresponding to the unfailing cells in the target battery pack, a number of state collection units corresponding to each cell management unit, identifications of the unfailing cells in the target battery pack, identifications of the unfailing cells corresponding to each cell management unit, identifications of the state collection units corresponding to the unfailing cells in the target battery pack, and identifications of the state collection units corresponding to each cell management unit.

In some embodiments of the present application, a storage area of a program that implements the battery management method when executed by the BMS is different from a storage area of the configuration information.

For the specific implementations and beneficial effects of the battery management method in the embodiments of the present application, please refer to the battery management system described above in conjunction with FIG. 1 and FIG. 2, which will not be repeated here.

Figure 4:
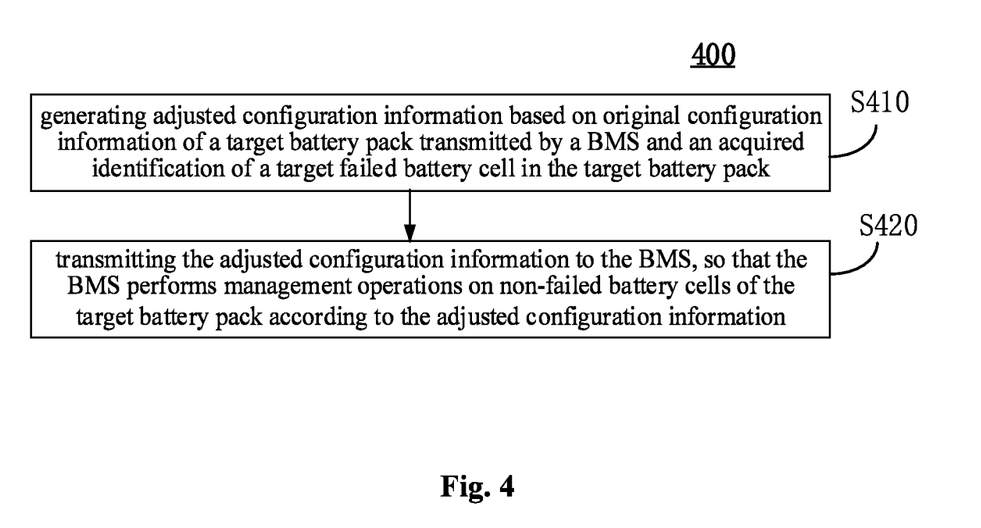
FIG. 4 is a schematic flowchart of a battery management method disclosed by an embodiment of the present application.

FIG. 4 is a schematic flowchart of a battery management method according to an embodiment of the present application. The battery management method is applied to the processing device. As shown in FIG. 4, the battery management method includes S410 and S420.

S410: generating adjusted configuration information based on original configuration information of a target battery pack transmitted by a battery management system BMS and an acquired identification of a target failure cell in the target battery pack.

S420: transmitting the adjusted configuration information to the BMS, so that the BMS performs management operations on unfailing cells of the target battery pack according to the adjusted configuration information.

In some embodiments of the present application, S410 includes:

adding the identification of the target failure cell to the original configuration information; using the original configuration information added with the identification of the target failure cell as the adjusted configuration information.

In some embodiments of the present application, the battery management method 400 further includes:

transmitting a first work instruction to the BMS, so as to prompt the BMS that a connection relationship between the unfailing cells of the target battery pack changes and instruct the BMS to return the original configuration information and an identification of a suspected failure cell; receiving the original configuration information and the identification of the suspected failure cell; using, under a condition that it is determined that the suspected failure cell is the target failure cell according to the identification of the suspected failure cell, the identification of the suspected failure cell as the identification of the target failure cell.

In some embodiments of the present application, the battery management method 400 further includes:

determining, in response to an input operation indicating the suspected failure cell is the target failure cell, the suspected failure cell is the target failure cell.

In some embodiments of the present application, the battery management method 400 further includes:

transmitting, in response to an operation of inputting the identification of the target failure cell, a second work instruction to the BMS, so as to prompt the BMS that a connection relationship between the unfailing cells of the target battery pack changes and instruct the BMS to return the original configuration information.

For the specific implementations and the beneficial effects of the battery management method in the embodiments of the present application, please refer to the battery management system and the processing device described above in conjunction with FIG. 1 and FIG. 2, which will not be repeated here. It should be noted that the various embodiments in this specification are described in a progressive manner, the same or similar parts between the various embodiments can be referred to each other, and each embodiment focuses on how it differs from the other embodiments. The method embodiment and the battery management and control system embodiment are described in a relatively simple manner, and for related details, please refer to the parts describing the battery management system embodiment and the processing device. The present application is not limited to the specific steps and structures described above and shown in the figures. Those skilled in the art can make various changes, modifications and additions, or change the order of the steps, after understanding the idea of the present application. Further, for simplicity, the detailed descriptions of well-known methods are omitted herein.

Functional blocks shown in the above embodiments may be implemented as hardware, software, firmware, or a combination thereof. When implemented in hardware, the functional blocks may be, for example, an electronic circuit, an Application Specific Integrated Circuit (ASIC), a suitable firmware, a plug-in, a function card and the like. When implemented in software, elements of the present application may be programs or code segments used to perform the required tasks. The programs or code segments may be stored in a machine-readable medium or transmitted over a transmission medium or a communication link via data signals carried in carriers. The "machine-readable medium" may include any medium capable of storing or transmitting information.

Although the present application has been described with reference to preferred embodiments, various modifications may be made thereto and components thereof may be replaced with their equivalents, without departing from the scope of the present application. In particular, as long as there is no structural conflict, various technical features mentioned in various embodiments can be combined in any manner. The present application is not limited to the specific embodiments disclosed herein, and instead, includes all the technical solutions that fall within the scope of the claims.

What is claimed is:

1. A battery management method applied to a battery management system BMS, wherein the battery management method comprises:
    transmitting, under a condition that it is determined that a connection relationship between unfailing cells of a target battery pack changes when a target failure cell in the target battery pack is isolated from the unfailing cells, original configuration information of the target battery pack to a processing device, so that the processing device generates adjusted configuration information according to the original configuration information;
    receiving the adjusted configuration information transmitted by the processing device, wherein the adjusted configuration information comprises an identification of the target failure cell;
    performing management operations on the unfailing cells of the target battery pack according to the adjusted configuration information, and
    wherein the adjusted configuration information further comprises information of the unfailing cells of the target battery pack, and performing management operations on the unfailing cells of the target battery pack according to the adjusted configuration information comprises:
        determining an adjustment coefficient of a performance parameter of the target battery pack according to the information of the unfailing cells of the target battery pack, wherein the adjustment coefficient is calculated by a number of the unfailing cells divided by a sum of the number of the unfailing cells and a number of the target failure cells;
        calculating the performance parameter of the target battery pack using the adjustment coefficient and an original performance parameter of the target battery pack,
        wherein the performance parameter comprises a charging characteristic parameter and/or a discharging characteristic parameter;
        the charging characteristic parameter comprises at least one of a charging voltage, a charging current, a charging power, a charging state of charge, and a charging capacity;
        the discharge characteristic parameter comprises at least one of a discharging voltage, a discharging current, a discharging power, a discharging state of charge, and a discharging capacity; and
        calculating the performance parameter of the target battery pack comprises calculating a product of the original performance parameter and the adjustment coefficient,
    wherein a storage area of a program that implements the battery management method when executed by the BMS is different from a storage area of the configuration information.

2. The battery management method of claim 1, wherein the battery management method further comprises:
    receiving a first work instruction transmitted by the processing device;
    determining, in response to the first work instruction, that the connection relationship between the unfailing cells of the target battery pack changes when the target failure cell in the target battery pack is isolated from the unfailing cells, and
    determining a suspected failure cell in the target battery pack, acquiring an identification of the suspected failure cell, and transmitting the identification of the suspected failure cell to the processing device, so that the processing device determines whether the suspected failure cell is the target failure cell according to the identification of the suspected failure cell.

3. The battery management method according to claim 1, wherein the battery management method further comprises:
    receiving a second work instruction transmitted by the processing device;
    determining, according to the second work instruction, that the connection relationship between the unfailing cells of the target battery pack changes when the target failure cell in the target battery pack is isolated from the unfailing cells.

4. The battery management method according to claim 1, wherein performing management operations on the unfailing cells of the target battery pack according to the adjusted configuration information comprises:
    collecting state parameters of the unfailing cells in the target battery pack according to the adjusted configuration information;
    judging whether states of the unfailing cells are abnormal according to the state parameters of the unfailing cells.

5. The battery management method according to claim 1, wherein the battery management method further comprises:
    determining the target failure cell of the target battery pack according to the identification of the target failure cell;
    arranging, according to an arrangement order of other cells in the target battery pack except the target failure cell, historical information of the other cells sequentially;
    arranging historical information of the target failure cell after historical information of a last cell of the other cells,
    wherein the historical information comprises a cell parameter that characterizes usage of a cell.

6. The battery management method according to claim 1, wherein the original configuration information comprises identifications of other failure cells in the target battery pack except the target failure cell or an identification that indicates the target battery pack comprises no failure cell.

7. A battery management method applied to a processing device, wherein the battery management method comprises:
generating adjusted configuration information based on original configuration information of a target battery pack transmitted by a battery management system, BMS, and an acquired identification of a target failure cell in the target battery pack;
transmitting the adjusted configuration information to the BMS, so that the BMS performs management operations on unfailing cells of the target battery pack according to the adjusted configuration information, and
wherein the adjusted configuration information further comprises information of the unfailing cells of the target battery pack, and the BMS performing management operations on the unfailing cells of the target battery pack according to the adjusted configuration information comprises:
determining an adjustment coefficient of a performance parameter of the target battery pack according to the information of the unfailing cells of the target battery pack, wherein the adjustment coefficient is calculated by a number of the unfailing cells divided by a sum of the number of the unfailing cells and a number of the target failure cells;
calculating the performance parameter of the target battery pack using the adjustment coefficient and an original performance parameter of the target battery pack,
wherein the performance parameter comprises a charging characteristic parameter and/or a discharging characteristic parameter;
the charging characteristic parameter comprises at least one of a charging voltage, a charging current, a charging power, a charging state of charge, and a charging capacity;
the discharge characteristic parameter comprises at least one of a discharging voltage, a discharging current, a discharging power, a discharging state of charge, and a discharging capacity; and
calculating the performance parameter of the target battery pack comprises calculating a product of the original performance parameter and the adjustment coefficient,
wherein a storage area of a program that implements the management operations when executed by the BMS is different from a storage area of the configuration information.

8. The battery management method according to claim 7, wherein generating the adjusted configuration information based on the original configuration information of the target battery pack transmitted by the BMS and the acquired identification of the target failure cell in the target battery pack comprises:
adding the identification of the target failure cell to the original configuration information;
using the original configuration information added with the identification of the target failure cell as the adjusted configuration information.

9. The battery management method according to claim 7, wherein the battery management method further comprises:
transmitting a first work instruction to the BMS, so as to prompt the BMS that a connection relationship between the unfailing cells of the target battery pack changes and instruct the BMS to return the original configuration information and an identification of a suspected failure cell;
receiving the original configuration information and the identification of the suspected failure cell;
using, under a condition that it is determined that the suspected failure cell is the target failure cell according to the identification of the suspected failure cell, the identification of the suspected failure cell as the identification of the target failure cell.

10. The battery management method according to claim 9, wherein the battery management method further comprises:
determining, in response to an input operation indicating the suspected failure cell is the target failure cell, the suspected failure cell is the target failure cell.

11. The battery management method according to claim 7, wherein the battery management method further comprises:
transmitting, in response to an operation of inputting the identification of the target failure cell, a second work instruction to the BMS, so as to prompt the BMS that a connection relationship between the unfailing cells of the target battery pack changes and instruct the BMS to return the original configuration information.

* * * * *